(12) United States Patent
Nakamura

(10) Patent No.: US 6,691,114 B1
(45) Date of Patent: Feb. 10, 2004

(54) GEOGRAPHICAL INFORMATION DISTRIBUTION SYSTEM, GEOGRAPHICAL INFORMATION DISTRIBUTION METHOD, GEOGRAPHICAL INFORMATION DISTRIBUTION SERVER, AND USER SERVICE PROVIDING SERVER

(75) Inventor: Kotaro Nakamura, Tokyo (JP)

(73) Assignee: Shobunsha Publications, Inc., Tokyo (JP)

( * ) Notice: Subject to any disclaimer, the term of this patent is extended or adjusted under 35 U.S.C. 154(b) by 320 days.

(21) Appl. No.: 09/679,125

(22) Filed: Oct. 4, 2000

(30) Foreign Application Priority Data

Jun. 28, 2000 (JP) ........................................ 2000-195268

(51) Int. Cl.[7] ............................................. G06F 17/30
(52) U.S. Cl. ......................... 707/10; 707/4; 707/104.1; 707/203
(58) Field of Search .................... 340/995; 701/208, 701/201, 209, 202, 211, 200, 300; 707/104.1, 3, 4, 102, 10, 104, 200, 203; 705/43, 27, 16, 20, 21, 22, 23; 455/432; 709/217, 213, 223, 236

(56) References Cited

U.S. PATENT DOCUMENTS

| | | | | |
|---|---|---|---|---|
| 5,682,525 A | * | 10/1997 | Bouve et al. | ............ 707/104.1 |
| 5,930,474 A | * | 7/1999 | Dunworth et al. | ............ 709/217 |
| 6,408,307 B1 | * | 6/2002 | Semple et al. | .............. 701/208 |

FOREIGN PATENT DOCUMENTS

JP          9-34902        2/1997

\* cited by examiner

*Primary Examiner*—Shahid Alam
*Assistant Examiner*—Fred Ehichioya
(74) *Attorney, Agent, or Firm*—Ladas & Parry

(57) ABSTRACT

A server of a geographical information distributor includes: a map database that stores map data; a search object database that stores data concerning search objects to be displayed on a map; and a search map generation unit that generates a search map using the map data and the search object data, based on a request from the server of a search object publisher that has registered the search object data. The search map generated by the search map generation unit is transmitted to the terminal of a service user, and the ID of a search object selected by the service user is transmitted to the search object publisher.

13 Claims, 17 Drawing Sheets

FIG. 3

| SEARCH OBJECT PUBLISHER REGISTRATION ID | NUMBER TO IDENTIFY A SEARCH OBJECT PUBLISHER |
|---|---|
| ITEM ID | NUMBER TO IDENTIFY AN ITEM |
| POSITIONAL COORDINATES (x, y) | COODINATE VALUES OF AN ITEM LOCATION |
| ICON TYPE CODE | CODE TO INDICATE THE TYPE OF A DISPLAYED ICON |
| DELETE FLAG | FLAG TO INDICATE WHETHER OR NOT DATA IS IN A REGULAR STATE OR IN A DELETE STATE |
| NAME | NAME TO BE DISPLAYED IN THE LIST |
| ADDRESS | ADDRESS TO BE DISPLAYED IN THE LIST |
| TELEPHONE NUMBER | TELEPHONE NUMBER TO BE DISPLAYED IN THE LIST |
| OTHER ATTRIBUTE INFORMATION | |
| : | |

FIG. 4

| SEARCH OBJECT PUBLISHER REGISTRATION ID | NUMBER TO IDENTIFY SEARCH OBJECT PUBLISHER |
|---|---|
| SEARCH OBJECT PUBLISHER NAME | NAME OF A SEARCH OBJECT PUBLISHER |
| REGISTRATION CONFIRMING INFORMATION | NECESSARY INFORAMTION FOR CHECKING REGISTRATION |
| SEARCH OBJECT PUBLISHER SERVER INFORMATION | INFORMATION ON SERVERS USED IN THE GEOGRAPHICAL INFORMATION DISTRIBUTION SYSTEM |
| : | |
| : | |

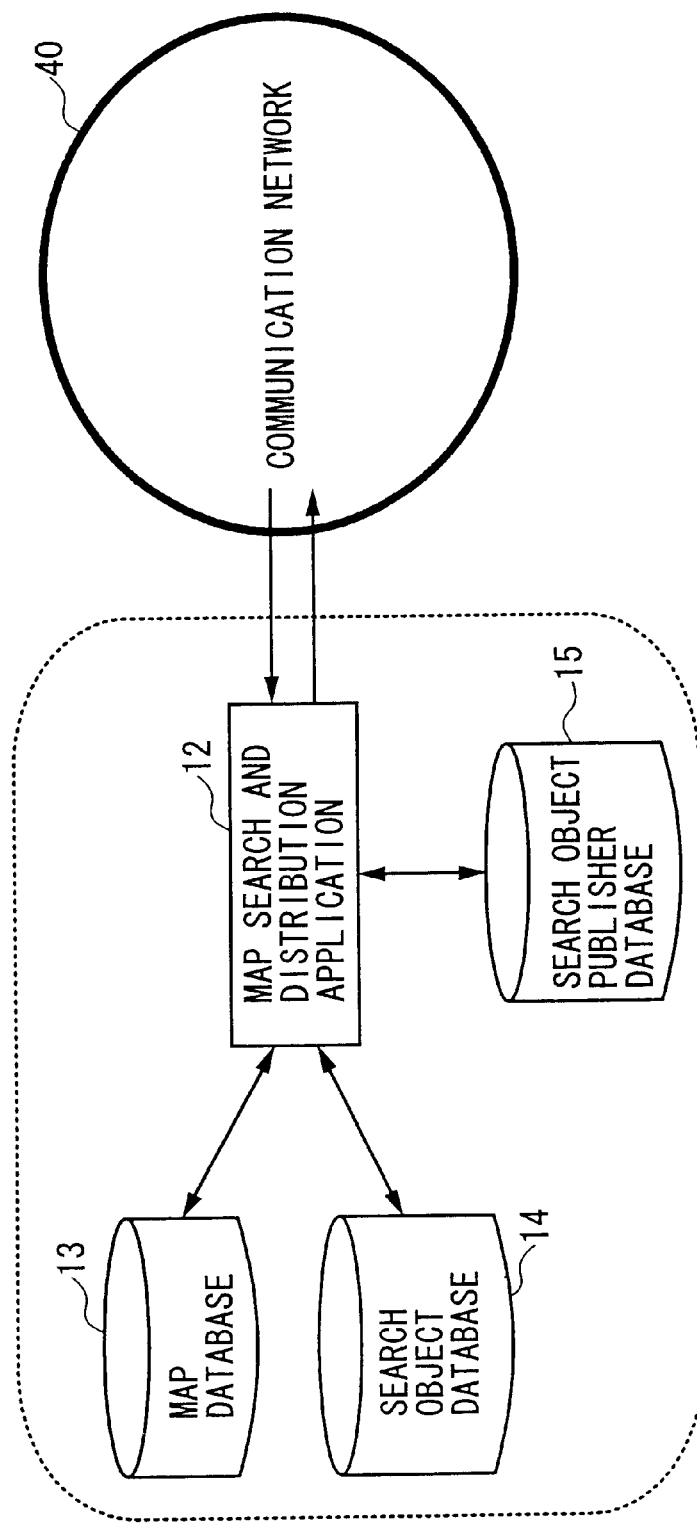

GEOGRAPHICAL INFORMATION DISTRIBUTION SYSTEM, GEOGRAPHICAL INFORMATION DISTRIBUTION METHOD, GEOGRAPHICAL INFORMATION DISTRIBUTION SERVER, AND USER SERVICE PROVIDING SERVER

BACKGROUND OF THE INVENTION

1. Field of the Invention

The present invention relates to geographical information distribution, and, more particularly, to a geographical information distribution system that distributes geographical information by which a location of service (accommodations, shopping, entertainment, and the like) of search objects (accommodation facilities, shops, theaters, and the like) is displayed on a map shown through a communication network. The present invention also relates to a method of specifying the contents of a service provided by a geographical information distribution system and a method of distributing geographical information. The present invention further relates to a server that distributes geographical information and a server that provides user services.

It should be noted that, in this specification, the "geographical information distribution system" and "geographical information distribution method" include the method of specifying the contents of a service, the server that distributes geographical information, and the server that provides user services.

2. Description of the Related Art

It is a well known method for the locations of shops and the like to be displayed on a map through the Internet, and for information concerning these places to be obtained. With this conventional method, however, objects displayed on the map include all the registered objects, and it is difficult to identify requested information on the map.

Also, the conventional geographical information providing service only displays objects selected by a service user, as well as advertisement information stored by a geographical information distributor, on a map selected by the service user. In this service, information concerning the objects selected by the service user may be stored in a server as log data. However, the above information stored in the server is not effectively utilized by the information suppliers, i.e., the geographical information distributor and the advertiser.

SUMMARY OF THE INVENTION

A general object of the present invention is to provide geographical information distribution systems and methods in which the above disadvantages are eliminated.

A more specific object of the present invention is to provide a geographical information distribution system and a method of distributing geographical information, in which only the information of search objects registered by a search object publisher that has made a request for geographical information is distributed and displayed on a map.

Another specific object of the present invention is to provide a geographical information distribution system and a method of distributing geographical information, in which identification information (the ID of each individual search object) of search objects on a map selected by a service user is dynamically transmitted to the search object publisher, so that the search object publisher can immeidately move on to the next service based on the ID of the selected search object.

The above objects of the present invention are achieved by a geographical information distribution system and a method of distributing geographical information, in which a server of a geographical information distributor connected to a communication network includes a map database that stores map data, a search object database that stores data of search objects to be displayed on a map, and a search map generation unit.

In response to a request from a service user through a server of a search object publisher that has registered the search object data, the above server of the geographical information distributor generates and supplies a search map to the service user, using the map data and the search object data. If the service user then selects one of the search objects displayed on the search map, the identification information of the selected search object is transmitted to the search object publisher.

Further, in accordance with the present invention, the geographical information distributor keeps base maps separately from search object data. The search object publisher makes a connection directly to a positional coordinate registration system of the geographical information distributor, so that the information of the search objects to be displayed on a map can be updated. A map search and distribution system turns positional information of the search object data, which is character data, into icons to be incorporated into the map data. Thus, as soon as the search object publisher updates the information in the search object database, the updated contents can be reflected in the service.

In accordance with the present invention, an initial screen image display request is transmitted through a search object publisher, so that which search object publisher is involved in the process is recognized in the geographic information distribution system. To distribute geographical information, only the search objects registered by the relevant search object publisher are retrieved from the search object database, and are then incorporated into the map to be distributed. Thus, the map having the relevant search objects incorporated therein can be displayed.

Furthermore, in accordance with the present invention, an item ID is allocated to each of the search objects when the search objects are stored, so that each search object selected by the service user can be accurately identified. The ID of each search object selected by the service user is recognized by the geographical information distributor, and is transmitted to the search object publisher through program processing.

The above and other objects and features of the present invention will become more apparent from the following description taken in conjunction with the accompanying drawings.

BRIEF DESCRIPTION OF THE DRAWINGS

FIG. 3 shows contents in search object data contained in a search object database of the present invention;

FIG. 4 shows contents in search object publisher data contained in a search object publisher database of the present invention;

FIG. 5 is a schematic view of a geographical information distribution system of the present invention;

DESCRIPTION OF THE PREFERRED EMBODIMENTS

The following is a description of embodiments of the present invention, with reference to the accompanying drawings.

Figure 1:
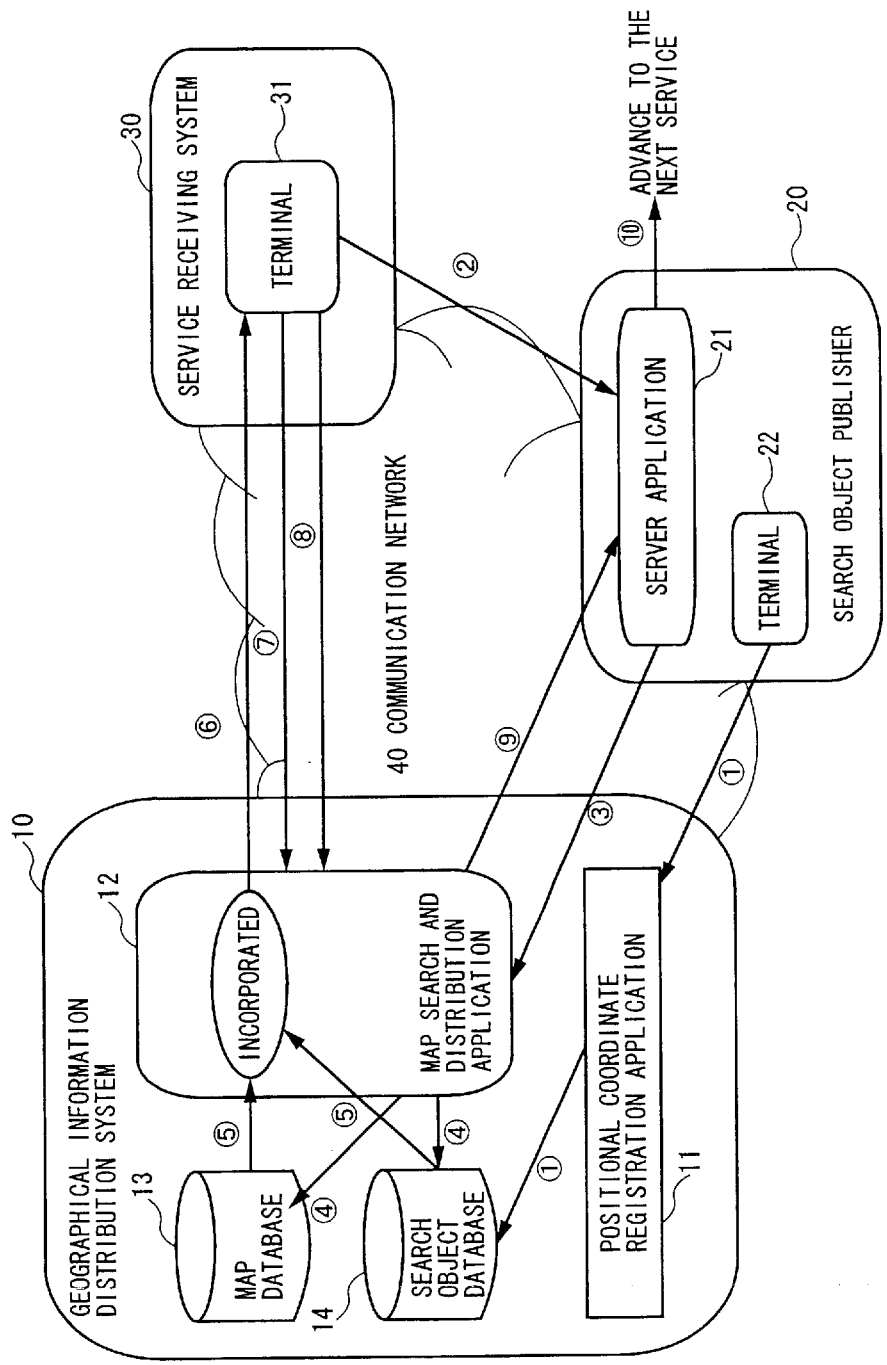
FIG. 1 illustrates a geographic information distribution system and a method of distributing geographic information in accordance with the present invention.

FIG. 1 schematically illustrates a geographical information distribution system and a method of distributing geographical information.

This system comprises a geographical information distribution system (server) 10 of a geographical information distributor, a search object publishing system (server) 20 of a search object publisher, and a service receiving system 30 of a service user. The geographical information distributor responds to a request of the search object publisher, and provides the geographical information as well as a search object to the service user. Therefore, the geographical information distributor is provided with the geographical information distribution system 10. This geographical information distribution system 10 comprises a positional coordinate registration application 11, a map search and distribution application 12, a map database 13, and a search object database 14.

The search object publishing system 20 of the search object publisher comprises a server application 21 and a terminal 22. As will be described later by way of detailed examples, the search object publisher is a travel agency, for instance, and a search object may be a hotel that is handled by the travel agency.

Among the above system components, the positional coordinate registration application 11, the map search and distribution application 12, and the server application 21 are information processing devices, each of which has communication functions and performs each corresponding application program. The terminal 22 of the search object publisher and a terminal 31 of the service user are standard information processing devices, such as personal computers, which are connected to a communication network 40 such as the Internet so as to send and receive information, and perform various control and data processing operations.

The service provided by this system will be described below in detail.

1) The geographical information distributor issues a registration ID to the search object publisher at the time of contract. The search object publisher registers in advance attribute information containing the positional coordinates of search objects into a storage device by a positional coordinate registration system constituted by the positional coordinate registration application 11 and the terminal 22 of the search object publisher ((①));

2) A map search request for the search objects is issued from the service user to the search object publisher ((②));

3) In response to the map search request, the search object publisher requests the geographical information distributor to display a map as an initial screen, and, upon receipt of the request, the geographical information distributor confirms the registration ID of the search object publisher that has made the request ((③));

4) After the confirmation of the registration ID, the geographical information distributor searches the map data and search object data for the requested search objects within the requested range ((④));

5) The search objects are displayed as icons and incorporated into a map that contains the area of the search objects ((⑤)):

6) The synthesized map data is sent to the service user that made the request in ((②)), and the map and a list of the search objects are displayed on the terminal 31 of the service user ((⑥));

7) The service user performs operations such as enlargement, reduction, and relocation, on the map, thereby repeating the steps of ((④)), ((⑤)), and ((⑥)), and displays a map image that indicates the positions of the search objects contained in the map data in the requested range ((⑦));

8) The service user selects from the retrieved search objects, and transmits the selection to the geographical information distributor through an operation such as pressing a selection button on a Web page ((⑧));

9) The geographical information distributor transmits the ID of the selected search object to the search object publisher ((⑨)); and 10) Based on the item ID, the search object publisher advances onto the next service ((⑩)).

Hereinafter, each of the individual systems that constitute the geographical information distribution system shown in FIG. 1 will be described.

Positional Coordinate Registration System

Figure 2:
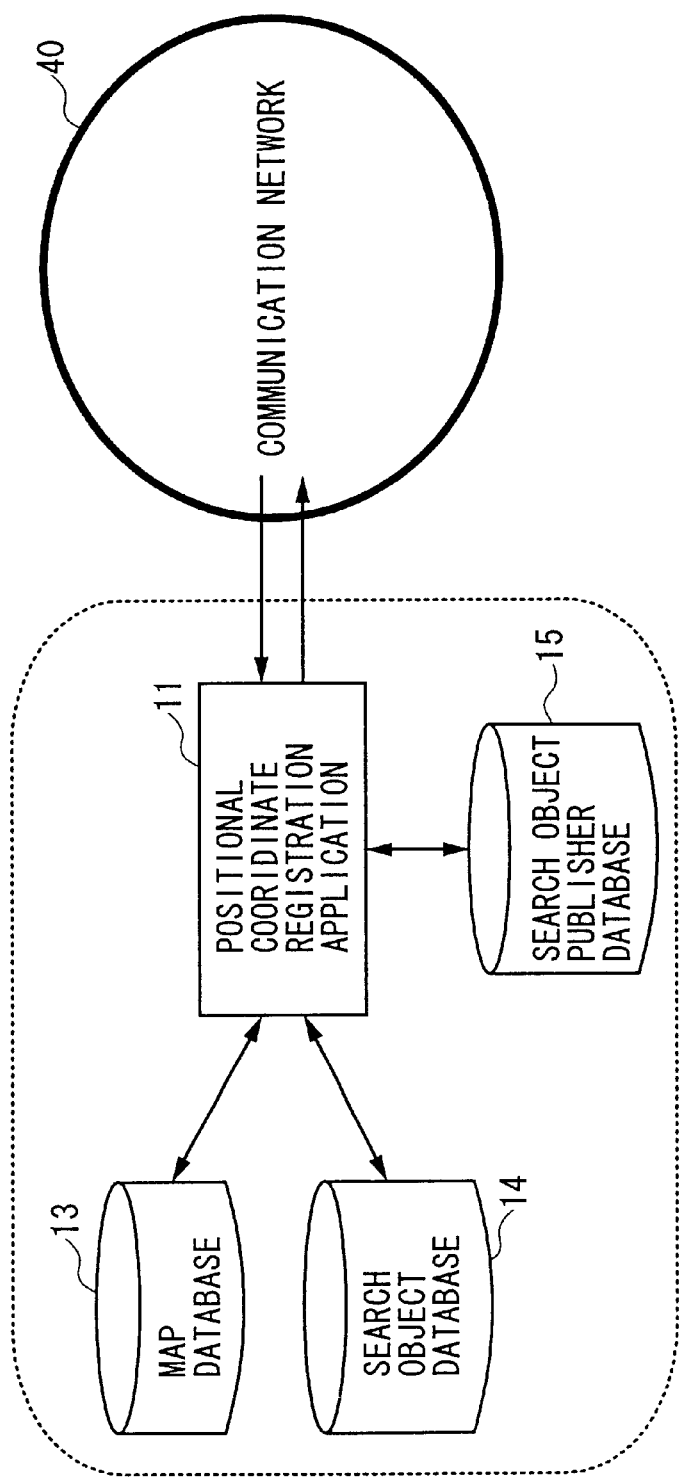
FIG. 2 is a schematic view of the structure of a positional coordinate registration system of the present invention.

Referring now to FIG. 2, a positional coordinate registration system for registering the positional coordinates of search objects in the positional coordinate registration application 11 of the geographical information distributor from the search object publisher will be described below.

The positional coordinate registration system comprises the positional coordinate registration application 11, the map database (file) 13, the search object database (file) 14, and a search object publisher database (file) 15.

The positional coordinate registration application 11 constitutes the core of this system of the present invention, and functions to execute an application program to register the positional coordinates.

The map database 13 is a storage unit that stores files of digital map data.

The search object database 14 is a storage unit that stores character string data of attribute information including the positional coordinates of search objects (such as the positions of shops) to be registered by each search object publisher.

FIG. 3 shows the contents in the search object database 14, which contents are stored in the CSV format. The positional coordinates are used to display an icon at a location of a search object on the map, and the item ID is used to transmit a selected search object to the server of the search object publisher. The attribute information of these contents is also used to create a list of search objects to be displayed for reference at the time of a search using the map.

The search object publisher database 15 is a storage device that stores the data of registered search object publishers that use this service.

FIG. 4 shows the contents of the search object publisher data.

The registration ID of each search object publisher is issued at the time of registration (contract) of the search object publisher with the service provided by the geographical information distributor. At the same time, information as to the registered user confirmation (such as a password) is also supplied at the time of logging in to the positional coordinate registration application.

Procedures of Registering in the Positional Coordinate Registration System

In the following, the procedures of registering search objects in the positional coordinate registration system will be described. Here, the registration is carried out with the use of the terminal 22 of the search object publisher, and the positional coordinate registration application 11 is accessed through the communication network 40 such as the Internet. The procedures will be explained with reference to images displayed on the screen (FIGS. 7 to 10).

(1) Logging In:

The search object publisher performs a logging-in operation to the positional coordinate registration application 11 through the communication network 40 such as the Internet. Here, the search object publisher inputs the registration ID, and transmits the registered user information by a predetermined registered user confirmation method.

Based on the received registered user information, the positional coordinate registration application 11 determines whether or not the logging in can be allowed, with reference to a list of registered search object publishers stored in the search object publisher database 15.

If the logging in is allowed, the search object publisher can move on to the following processes in the positional coordinate registration application 11.

Using each of functions of the positional coordinate registration application 11 described below, the registration information in the search object database 14 can be handled in accordance with the images displayed on the screen of the terminal 22.

(2) New Item Registration:

The positional coordinate registration application 11 obtains data from the map database 13, and instructs the terminal 22 of the search object publisher to display the map. The positional coordinate registration application 11 then prompts the search object publisher to issue an instruction as to the position of an item (see FIG. 7A).

The search object publisher clicks a registration button 110 on the screen menu, and selects a symbol 1 (icon) 101. The search object publisher then sets the cursor at a location 100, at which the item is to be registered, and clicks a registration button 102.

By the click of the registration button 110, a map is displayed in the frame. The location of registration is focused on using a direction icon 120 and a zoom icon 130.

The registration button 102 is clicked to register the facility at the location, and a map moving button 103 is used to switch the screen to the map of the surrounding area of the clicked location.

By clicking an arrow button of a desired direction of the direction icon 120, the location on the map can be moved in the desired direction. By clicking the zoom icon 130, the location can be enlarged or reduced.

Figure 7A:
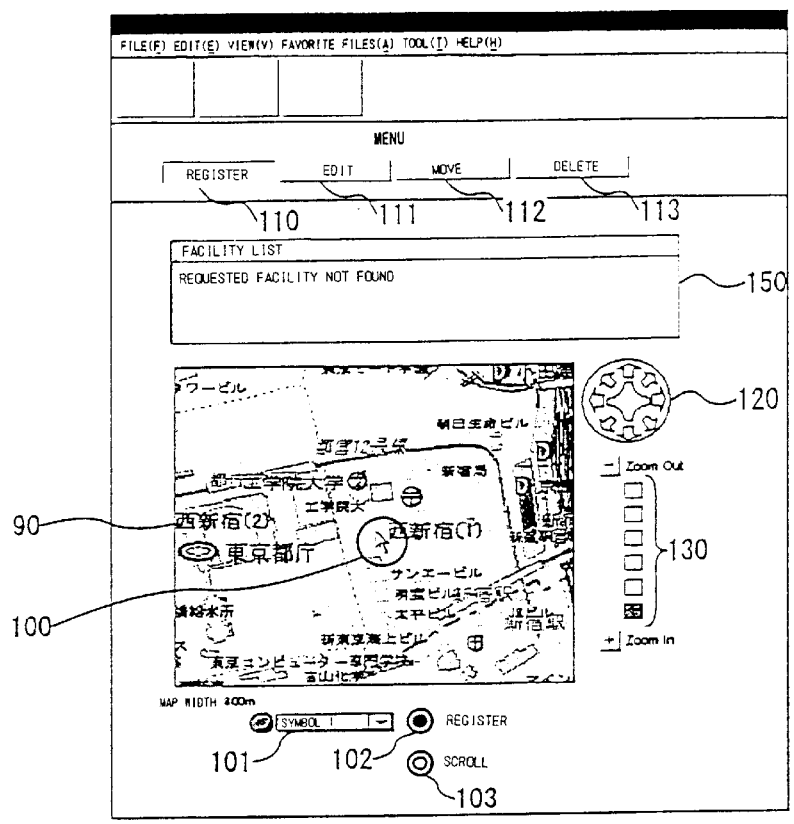
FIGS. 7A and 7B illustrate registration of search object items.
Figure 7B:
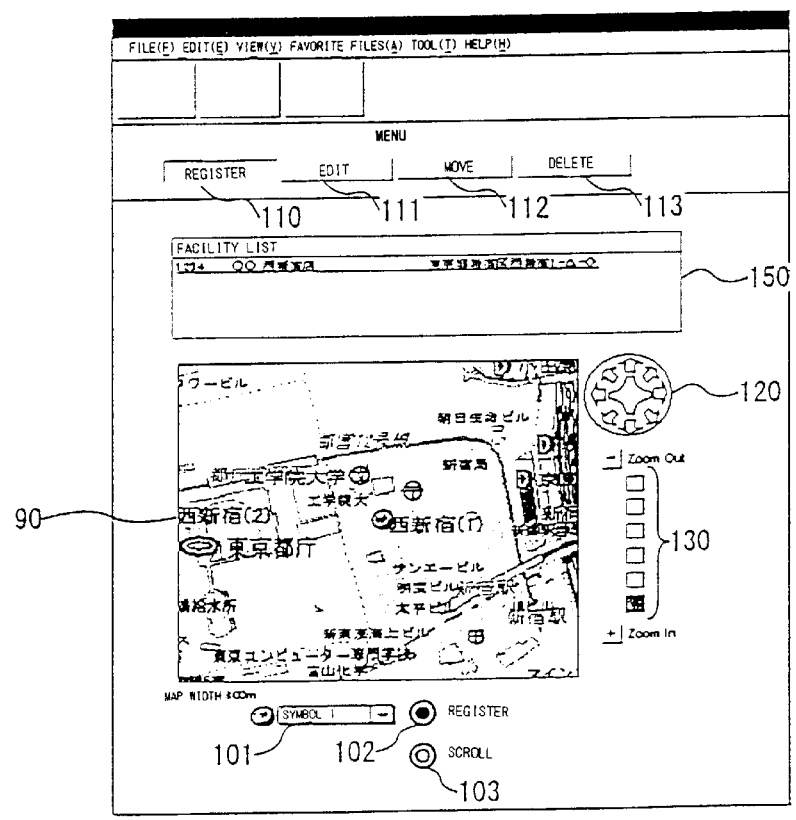

After the registration, a predetermined icon is displayed at the designated location on the map (see FIG. 7B).

The positional coordinate registration application 11 acquires the coordinate values of the location designated on the map by the search object publisher, and writes the positional coordinate values of the item in the search object database 14. Inputted attribute information is also rewritten in the search object database 14.

In the positional coordinate registration application 11, a method of focusing on a location on a map covering a wide area or a method of displaying the surrounding area of a target location through a retrieving operation using the name of the target city or town can be employed.

(3) Collective Registration of New Items

If the search object publisher has other attribute information, the attribute information is prepared as a file of a predetermined format, and a predetermined operation is performed in the positional coordinate registration application 11. The file of the attribute information is then read out by the positional coordinate registration application 11, which then collectively registers or imports the contents of the file into the search object database 14.

If the file of the predetermined format does not include the positional coordinate information, the positional coordinate registration application 11 displays a list of the non-registered positional data on the screen of the terminal 22 of the search object publisher, and prompts the search object publisher to set the location of a designated item. The positional coordinate registration application 11 then acquires the coordinate values of the designated location, and writes the positional coordinate values of the item in the search object database 14.

The registration of the search objects by the search object publisher can be collectively performed using the positional information of the search objects to be registered.

(4) A Change to the Attribute Information of Registered Items

Figure 8A:
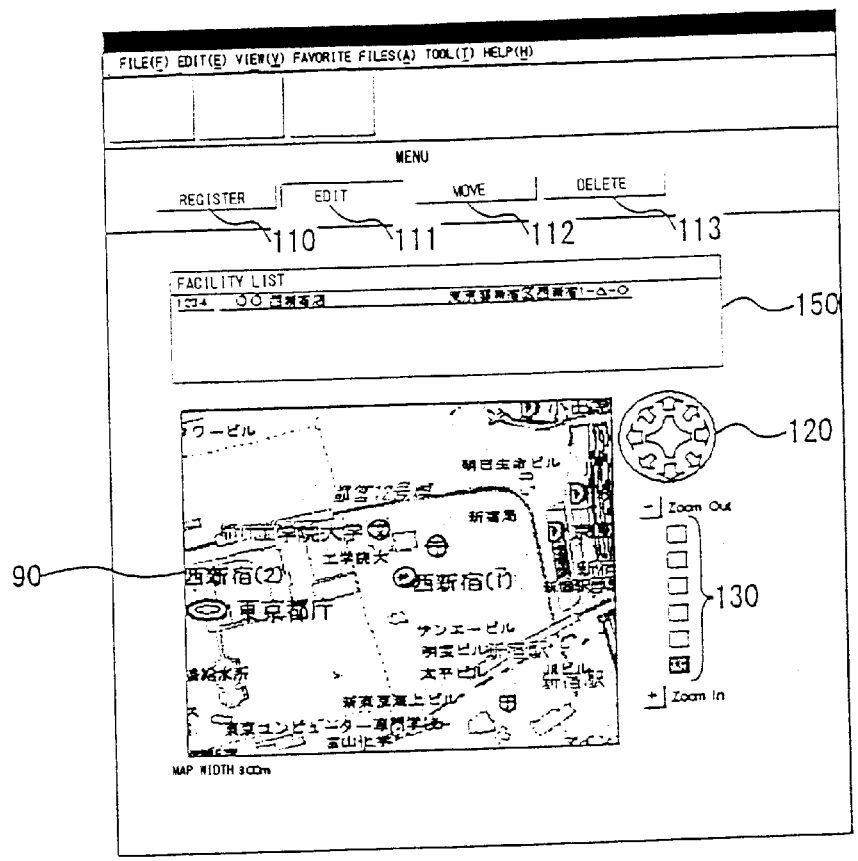
FIGS. 8A and 8B illustrate editing of search object items.
Figure 8B:
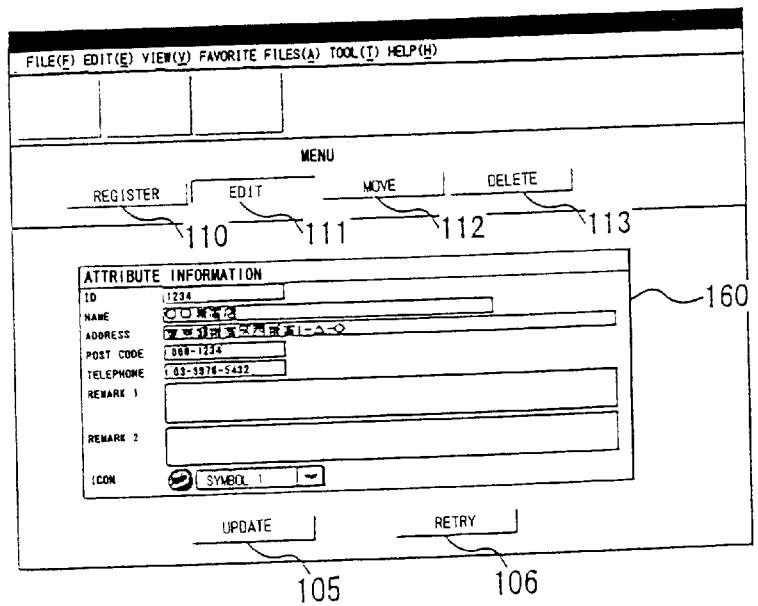

FIGS. 8A and 8B are editing screens for inputting or making a change to the attribute information of the registered items.

FIG. 8A is a screen displaying a map immediately after an edit button is clicked.

The screen shown in FIG. 8B is called by clicking a facility (a search object) or a facility represented by the attribute information in the information of the items already registered in the search object database 14.

FIG. 8B is an attribute information input/change screen, through which IDs and names are inputted. The positional coordinate registration application 11 writes attribute information to be newly inputted into the search object database 14. If an update button 105 is then clicked, the information of the facility is updated. If a retry button is then clicked instead of the update button 105, the attribute information, which is being edited, is restored to the original state.

The display icon for the location of an item can be selected from a list. The selected result is written as an icon type code in the search object database 14.

(5) Relocation of Registered Items

Figure 9A:
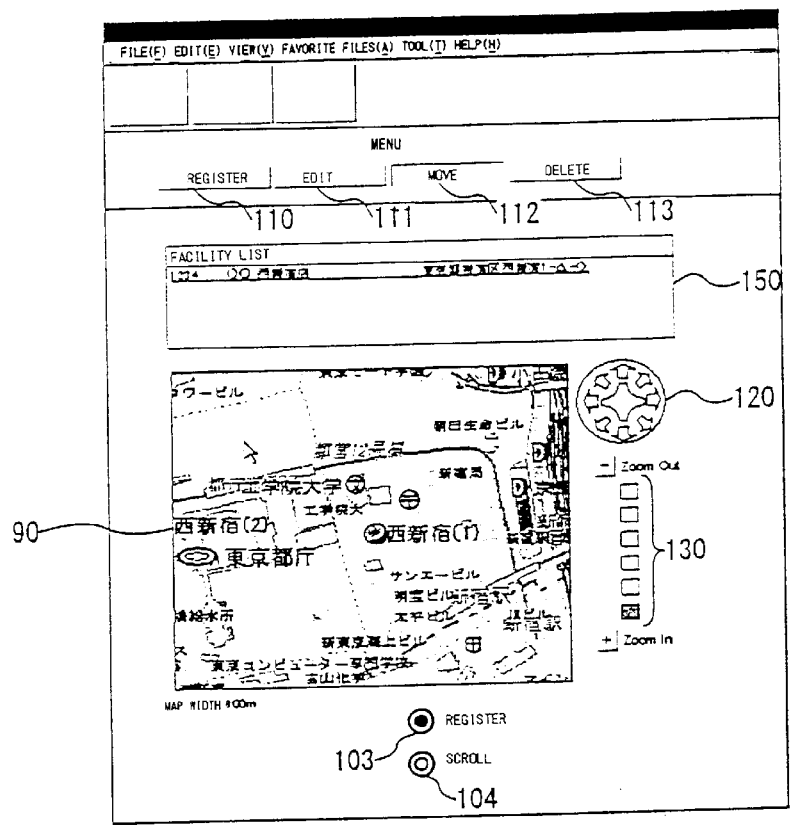
FIGS. 9A and 9B illustrate relocation of search object items.

FIG. 9A illustrates a case where a search object located in Nishi-Shinjuku is moved to a location pointed to by the arrow on the upper left-hand side of the screen.

Figure 9B:
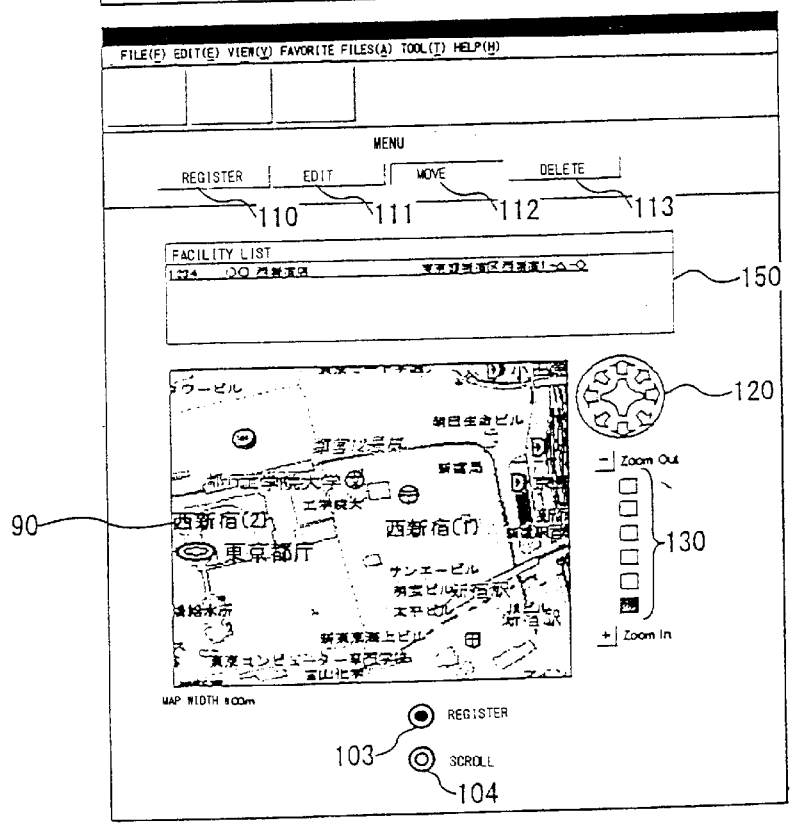

First, a move button in the menu is clicked to display the map. The direction icon 120 and the zoom button 130 are then clicked on the map so as to focus on the display location, thereby obtaining the screen image shown in FIG. 9A. The mouse is clicked at a desired location, so that the facility can be moved to the desired location. The display of the moved facility is instantly updated on the map, as shown in FIG. 9B.

It should be noted that the above processes are performed by the positional coordinate registration application 11.

(6) Deletion of Registered Items

Figure 10A:
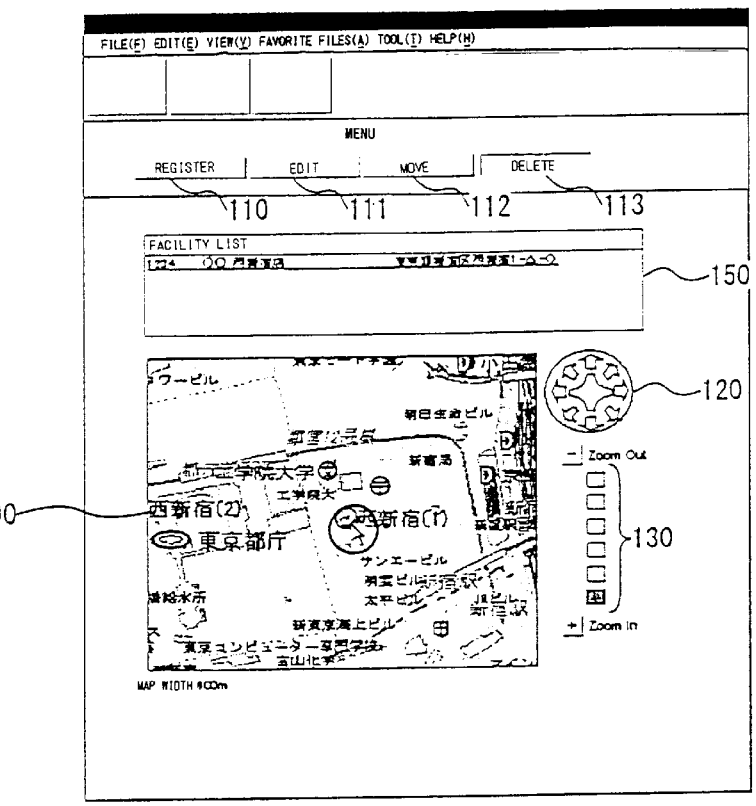
FIGS. 10A and 10B illustrate deletion of search object items.

The icon of an object to be deleted from the map displayed by the positional coordinate registration application 11 is designated among the items already registered in the search object database 14, as shown in FIG. 10A.

The designation of the icon of the object to be deleted is carried out by clicking the icon of the facility (i.e., the object to be deleted) in the list of displayed facilities or on the map.

Figure 10B:
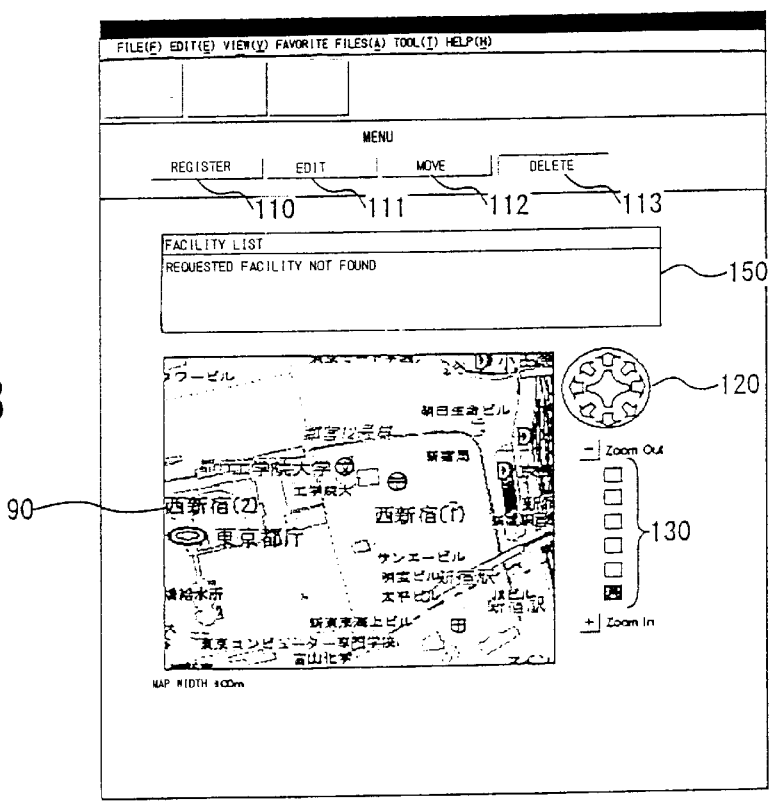
Figure 11A:
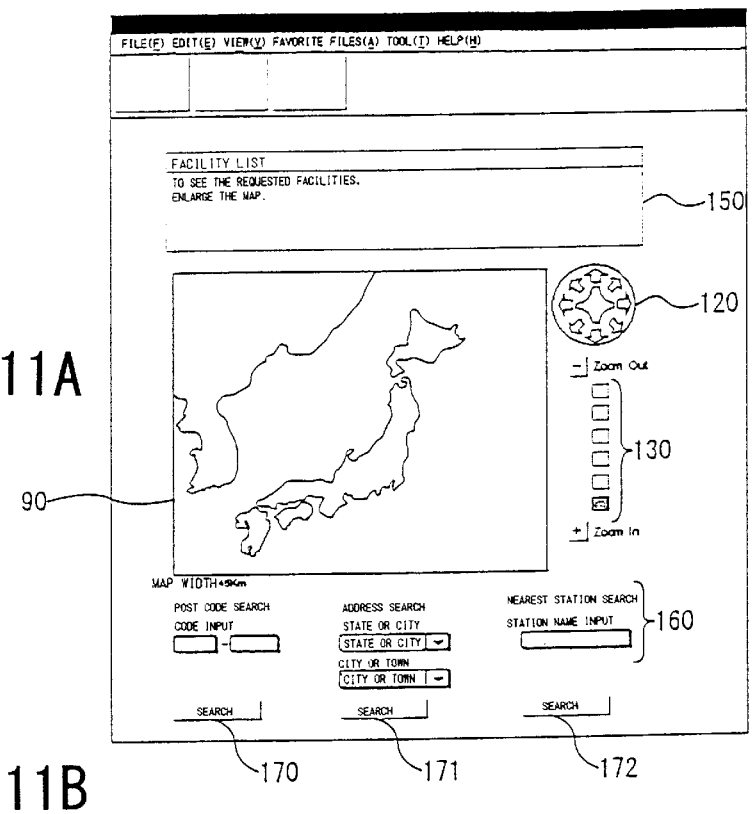
FIGS. 11A and 11B illustrate a search for search object items.
Figure 11B:
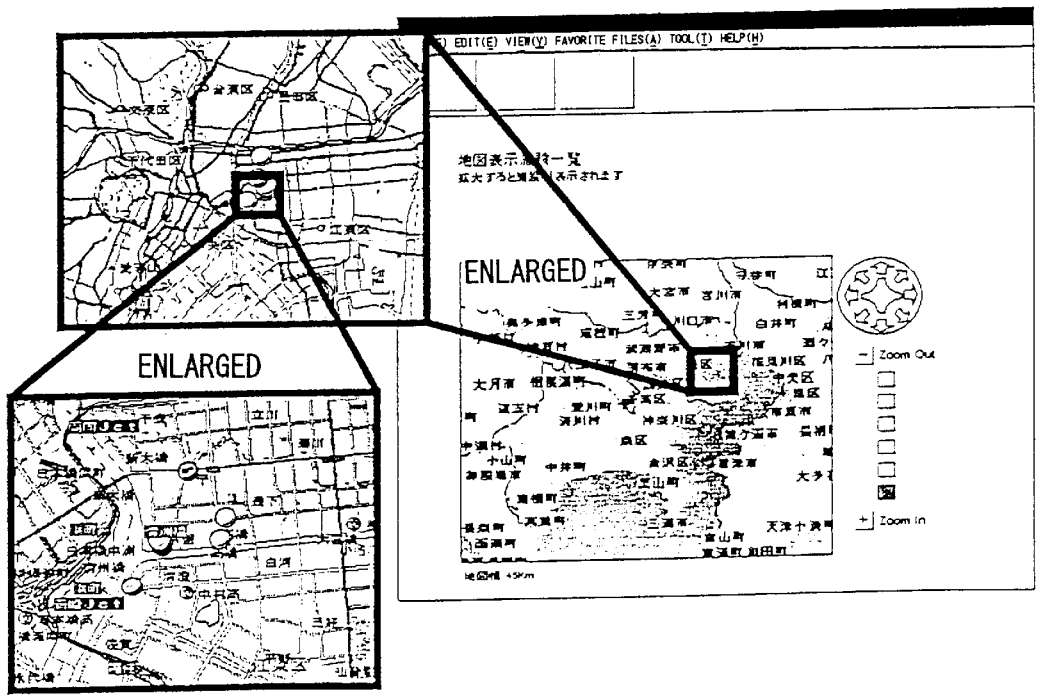

The positional coordinate registration application 11 performs a write operation in the search object database 14 so that the value of a delete flag for the designated object to be deleted is set to indicate a deletion state (or the corresponding data itself is simply deleted from the search object database 14). At this point, the icon is deleted from the map on the display, as shown in FIG. 10B.

(7) Logging Off

After the above series of operations have been completed, the search object publisher performs a logging-off operation on the positional coordinate registration application 11, thereby disengaging the connection.

Information that has been registered, updated, or deleted in the search object database 14 is immediately incorporated into the service, if the search object database 14 is identical with the search object data used in a map search and distribution system (described later). If the search object database 14 is not identical but a duplicated copy, the information is incorporated into the service after a synchronization process is performed on the search object data used in the geographical information distribution system.

Map Search And Distribution System

Next, the map search and distribution system that is included in the geographical information distribution system in a service location designation system will be described.

FIG. 5 is a block diagram of the map search and distribution system.

This map search and distribution system comprises the map search and distribution application 12, the map database 13, the search object database 14, and the search object publisher database 15.

The map search and distribution application 12 is an application program that constitutes the main structure of this system, and has functions such as search and retrieval from the map database 13 and the search object database 14, generation of distribution map data, transmission of map data, acquirement of a request from a service user, and transmission of the item ID of a search object to the search object publisher.

The map database 13 is a storage device that stores files of digital map data, as described above.

The search object database 14 is a storage device that stores character string data of attribute information including positional coordinates of search objects (such as shops) to be registered by each search object publisher, as described above.

The search object publisher database 15 is a storage device that stores search object publishers who use the service.

In the following, the functions of the map search and distribution system will be described with reference to the operation flow shown in FIG. 1.

(1) Confirmation of a search object publisher registration ID in response to an initial screen image display request (equivalent to (③) in FIG. 1):

The initial screen image display request, which is the first access to the map search and distribution application 12, is transmitted from a service user through the Web page of a registered search object publisher. The map search and distribution application 12 acquires the registration ID of the search object publisher contained in the received initial screen image display request, and checks the list of registered search object-publishers stored in the search object publisher database 15. If the registered ID is not found, an error massage is outputted, thereby terminating the operation.

The registered ID is stored throughout the procedures until the series of operations is completed.

(2) Search and retrieval of a map corresponding to the requested map display range (equivalent to (④) and (⑤) in FIG. 1):

The map search and distribution application 12 receives the initial screen image display request transmitted through a Web page of a search object publisher, or request map display range information determined by a map handling instruction issued from a service user, through the Internet. The map search and distribution application 12 then searches the map database 13 for the map data corresponding to the requested map display range, and retrieves the map data.

(3) Search and retrieval of the search object corresponding to the requested map display range (equivalent to (④) and (⑤) in FIG. 1):

The map search and distribution application 12 searches the search object database 14 and retrieves the data of a search object that is included in the requested map display range and belongs to the corresponding search object publisher (i.e., the ID of the search object matches with the search object publisher registration ID acquired in (①)).

The positional coordinates of the retrieved data are used to display the corresponding icon on the map, and the attribute information, such as the name and address, is used for displaying a list.

(4) Generation of transmission data by incorporating the search objects into the retrieved map data (equivalent to (⑤) in FIG. 1):

The map search and distribution application 12 generates map data by placing an icon corresponding to an icon type code at a location corresponding to the positional coordinates (x, y) on the map data retrieved in (2).

(5) Transmission of the map data and the attribute information (equivalent to (⑥) in FIG. 1):

The map search and distribution application 12 transmits the map data generated in (4) and the attribute information (a list of the retrieved items generated in (3) to the service user, who has made the request. The transmitted map data and the attribute information are displayed on the terminal 31 of the service user system.

(6) Acquirement of a geographical information handling instruction (equivalent to FIGS. 11A to 12B, and ⑦ in FIG. 1):

The service user performs operations, such as enlargement, reduction, and relocation, on the map distributed by the geographic information distributor and the screen image. The map search and distribution application 12 then receives a handling instruction, and calculates a new requested map display range based on the handling instruction.

The operation then returns to (2), and the processes following (2) are repeated.

In a case where only one search object is selected, the operation moves on to the process of (7).

Figure 12A:
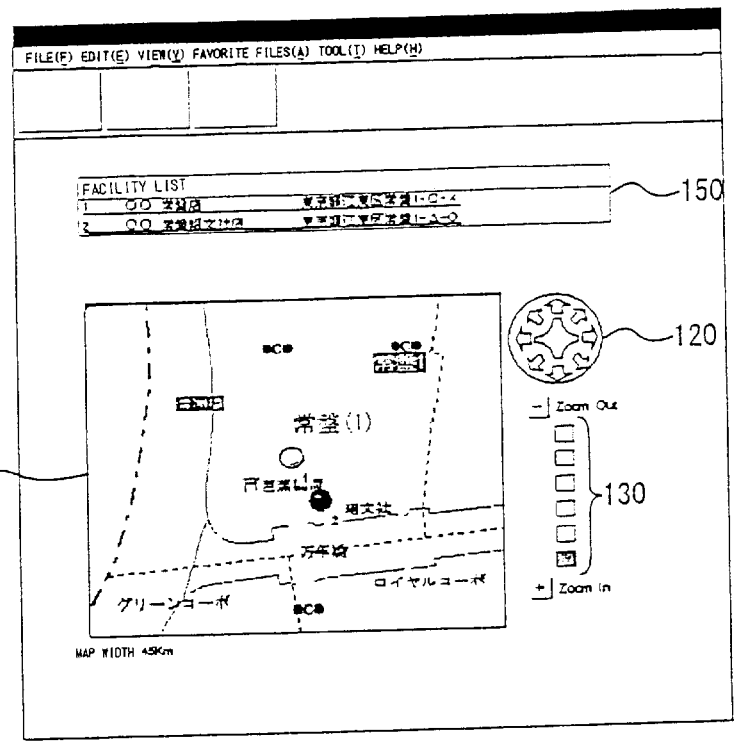
FIG. 12A is a list display of search object accommodations.
Figure 12B:
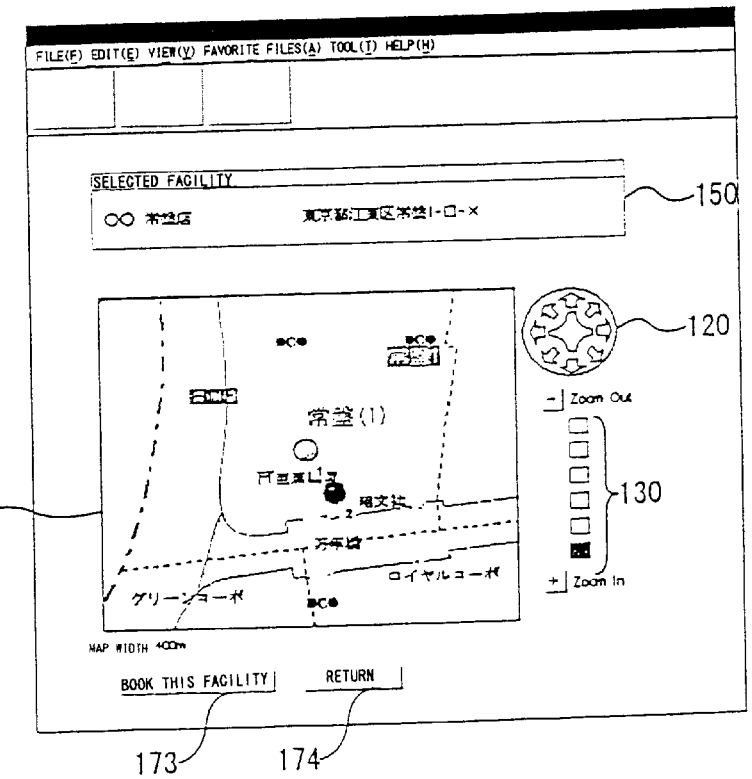
FIG. 12B is a display of a selected one of the search object accommodations.

(7) Acquirement of the selection information of a search object to be displayed on the map (equivalent to ⑧ in FIG 1):

The service user finally selects one of the search objects from the displayed map, and clicks a button for indicating the selection (a "book this facility" button shown in FIG. 12B). By doing so, the service user transmits the selection information to the map search and distribution application 12. Thus, the map search and distribution application 12 acquires the item ID of the selected search object.

(8) Transmission of the item ID of the selected search object to the search object publisher (equivalent to ⑨ in FIG. 1):

The map search and distribution application 12 transmits the item ID of the selected search object acquired in (7) to the search object publisher that has made the initial screen image display request in (1). After the transmission, the series of processes performed by the map search and distribution application 12 are completed.

Search Object Publishing System

Next, the search object publishing system 20 in the service location designation system will be described.

The search object publishing system 20 comprises the server application 21 and the terminal 22. Basically, the server application 21 of the search object publisher can have any desired structure, but the interface specification (the specification of the transmission data of the initial screen image display request and the specification of the transmission data of the item ID of the selected item) for communicating with the map search and distribution system is determined by the geographical information distributor. Transmission and reception are carried out in accordance with the specification. In the following, processes in the search object publishing system will be described.

(1) Map initial screen image display request

When the server application 21 of the search object publisher receives a map search request from the service user, it transmits an initial screen image display request to the geographical information distributor in accordance with the specification of the transmission data of the initial screen image display request.

(2) Acquirement of the item ID of a selected search object

In accordance with the specification of the transmission data of the item ID of a search object selected by the service user using the map, the geographical information distributor transmits the item ID information. The server application 21 of the search object publisher receives the item ID information, and specifies the selected search object based on the item ID.

The switching between a search object publisher screen image and a map screen image provided by the geographical information distributor will be described later in detail.

Hereinafter, specific example services to be provided by the system of the present invention will be described.

SPECIFIC EXAMPLE 1

Figure 6:
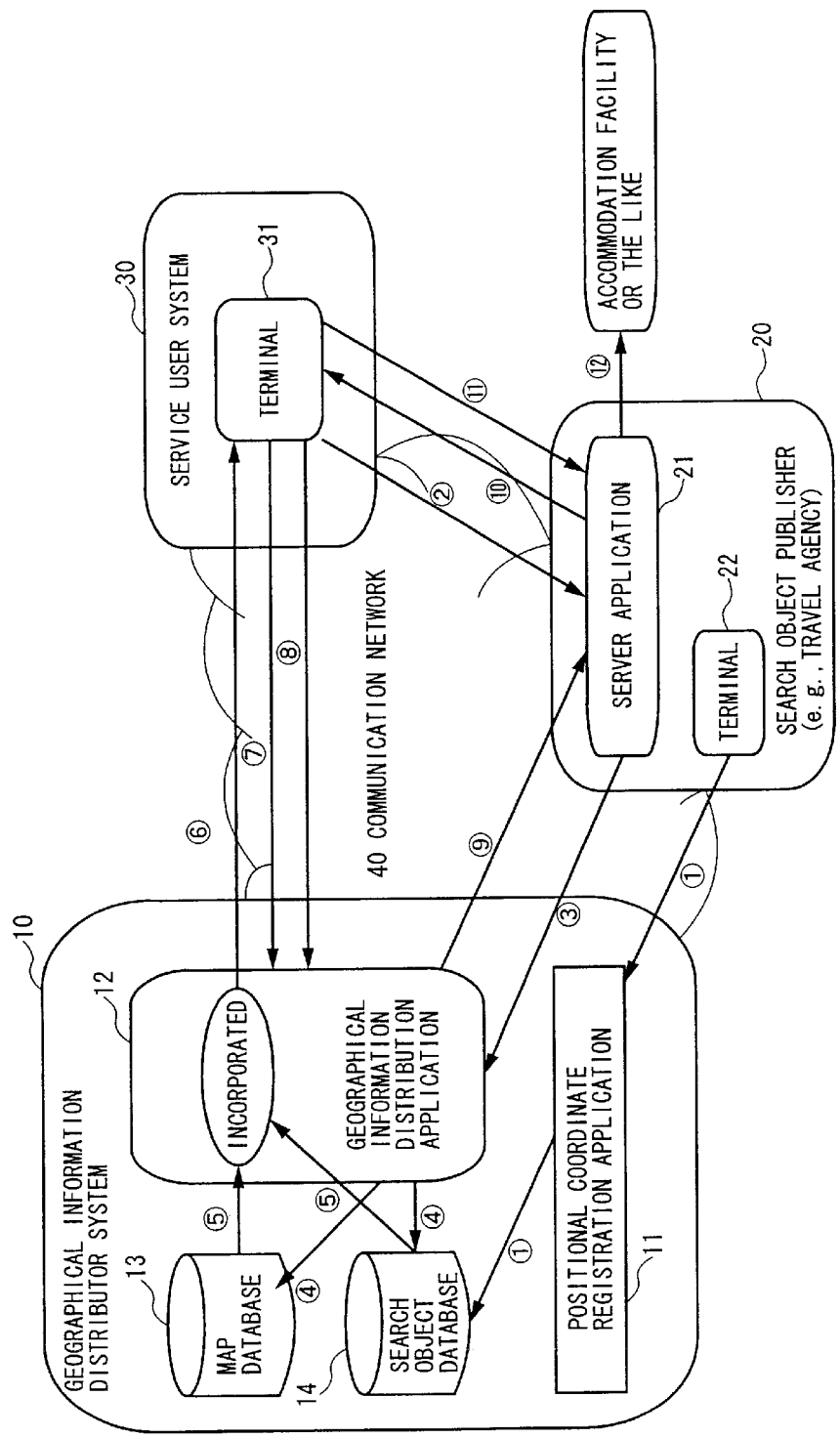
FIG. 6 illustrates a detailed example service using the geographical information distribution system and the method of distributing geographical information in accordance with the present invention.

Referring now to FIG. 6, a specific example of the service location designation system will now be described. In this example, the search object publisher is a travel agency, and search objects are accommodation facilities.

In this example, the travel agency puts the location information of accommodation facilities that are handled by the travel agency on a map, and a service user searches for a desired accommodation facility using the map. After the search result is transmitted as a shop ID to the travel agency, a reservation coupon or the like is issued to the service user, thereby completing the booking of the desired accommodation facility.

In the following, the processes of the service will be described, with reference to FIGS. 6 and 13A to 17B.

(1) The travel agency registers in advance the positional coordinates of accommodation facilities as search objects, icon type codes, the names of the facilities, the addresses and telephone numbers of the facilities, and other miscellaneous information into the storage device (①).

(2) The service user sees the Web page of the travel agency and uses the accommodation booking service. Here, the service user clicks a "map search" button 53 to search for accommodation facilities from the map ((②), FIG. 13A).

(3) The server application 21 of the travel agency that has received the request then sends the geographical information distributor a request to display a map search initial screen image in a designated format. There, if the area is designated as Hakone, the initial screen image should be a map that shows a wide surrounding area of Hakone. If the area is not specified, the initial screen image should be a map of the entire Japan archipelago. The geographical information distributor that has received the request from the travel agency confirms the registration ID of the travel agency that is contained in the request information ((③)).

(4) The map search and distribution application 12 of the geographical information distributor retrieves a map in the requested range from the map database 13, and further retrieves items that are contained in the requested range and correspond to the confirmed registration ID of the travel agency from the search object database 14 ((④)).

(5) The map search and distribution application 12 of the geographical information distributor incorporates the retrieved accommodation facilities into the retrieved map by displaying icons corresponding to the icon type codes based on the positional coordinates ((⑤)).

Figure 13A:
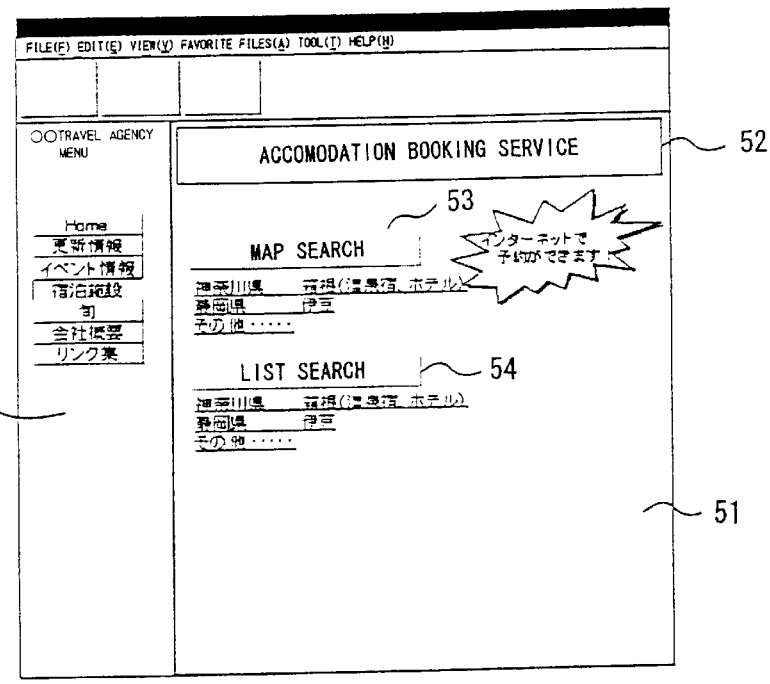
FIGS. 13A and 13B show screens in the procedures of providing accommodation booking service in accordance with the present invention.
Figure 13B:
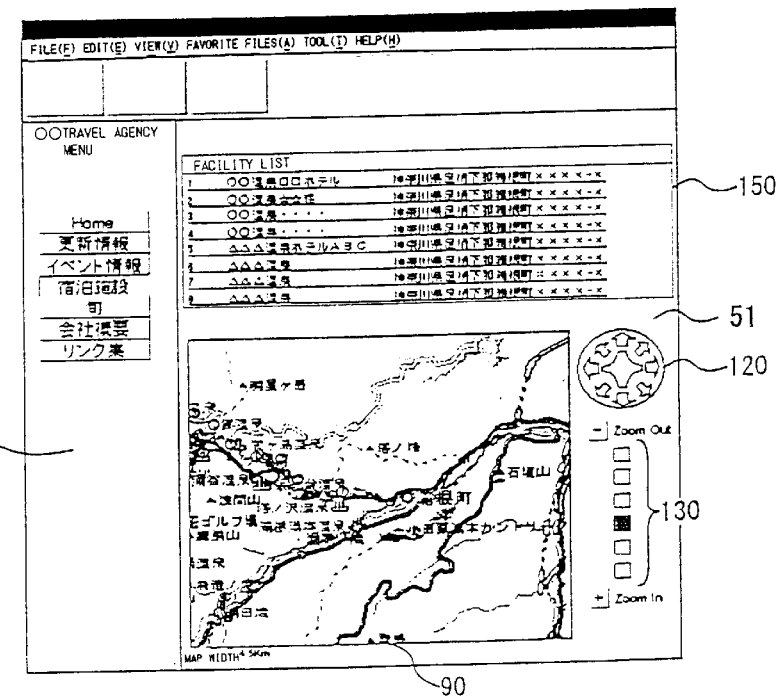

(6) The map search and distribution application 12 of the geographical information distributor transmits the incorporated map image to the service user that has made the request in (2), and a map 90 and a list 150 of accommodation facilities are displayed on the terminal 31 of the service user ((⑥), FIG. 13B).

The map and the list are displayed within a frame 51 on the Web page provided by the server application 12 of the travel agency.

(7) The service user then performs an operation such as enlargement, contraction, or scrolling, on the map, thereby requesting the map search and distribution application 12 of the geographical information distributor to indicate a new map display range ((⑦)).

Figure 14A:
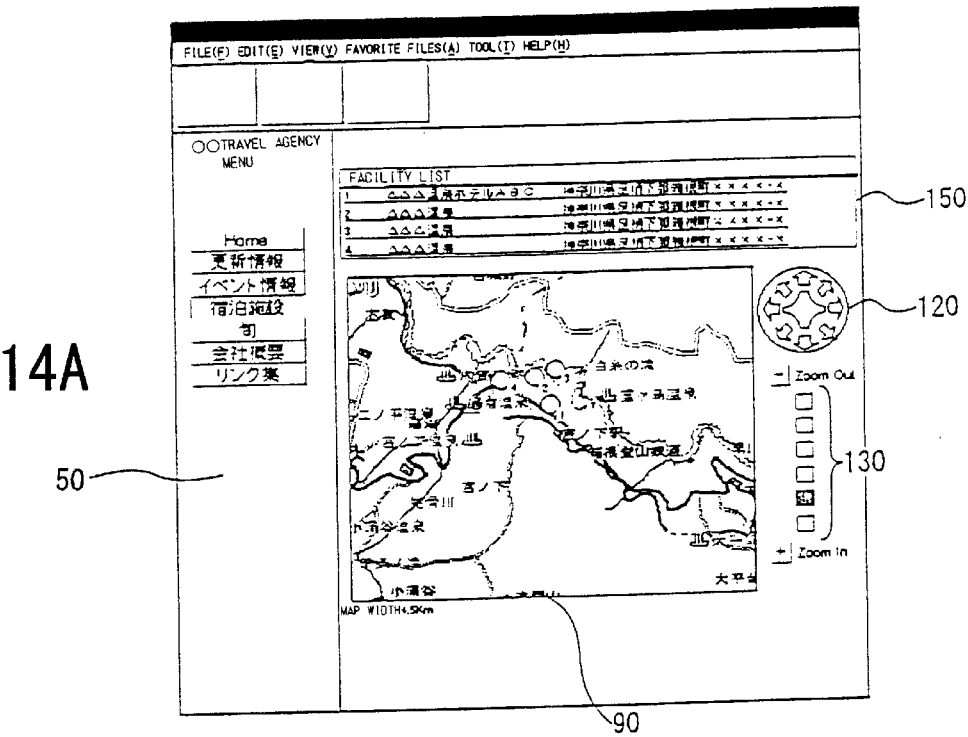
FIGS. 14A and 14B show screens in the procedures of providing accommodation booking service in accordance with the present invention.
Figure 14B:
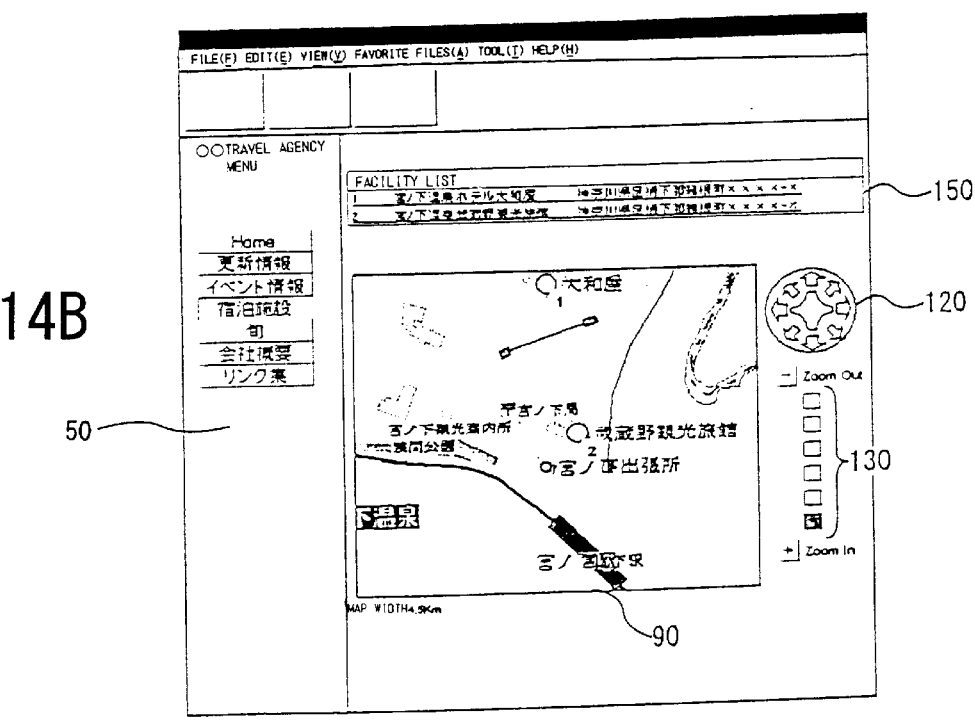

After that, the processes of (4), (5), and (6) are repeated, so that a map image that indicates the locations of accommodation facilities contained in the requested range is displayed (FIGS. 14A and 14B).

Figure 15A:
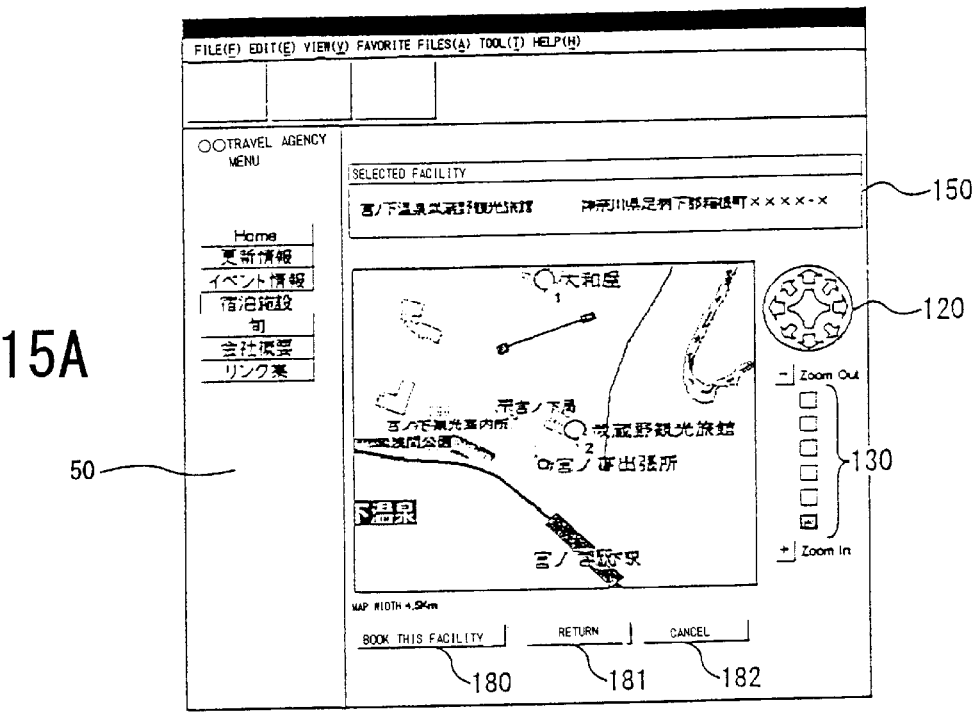
FIGS. 15A and 15B show screens in the procedures of providing accommodation booking service in accordance with the present invention.

(8) The service user then selects one of the accommodation facilities retrieved through the above processes, and clicks a "book this facility" button 180 shown in FIG. 15A. By doing so, the information of the selected facility is transmitted to the geographical information distributor ((8)).

(9) The map search and distribution application 12 of the geographical information distributor that has received information of the selected facility then transmits the item ID of the accommodation facility selected by the service user to the travel agency ((9)).

Figure 15B:
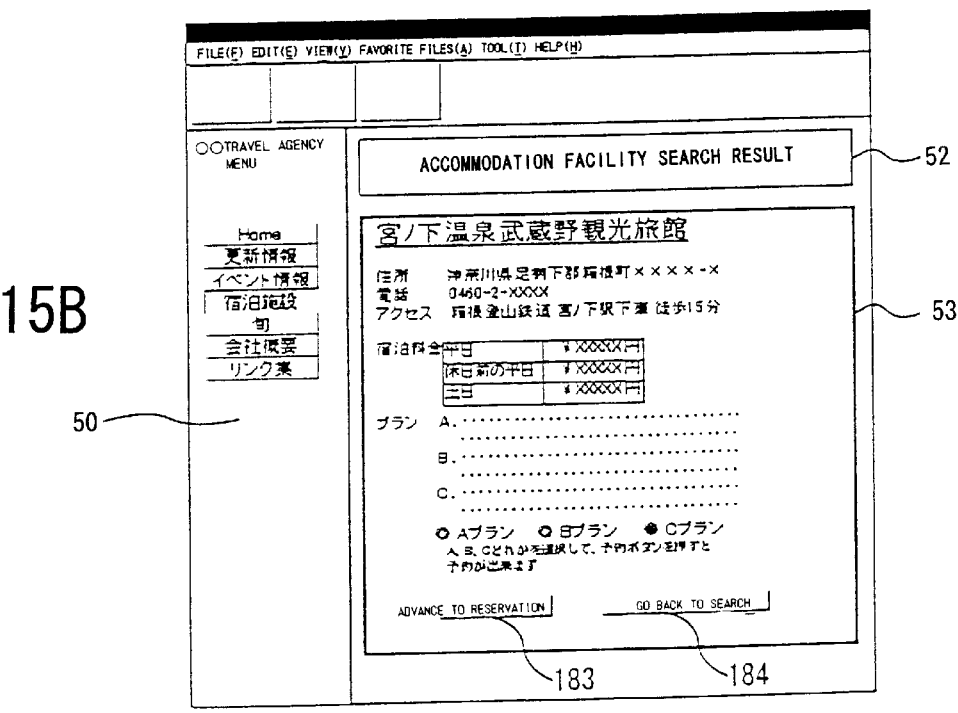

(10) The server application 21 of the travel agency displays the information of the search object, based on the received item ID (FIG. 15B). If a "reservation" button 183 is clicked here, the operation advances to a process of reservation service ((10)).

Figure 16A:
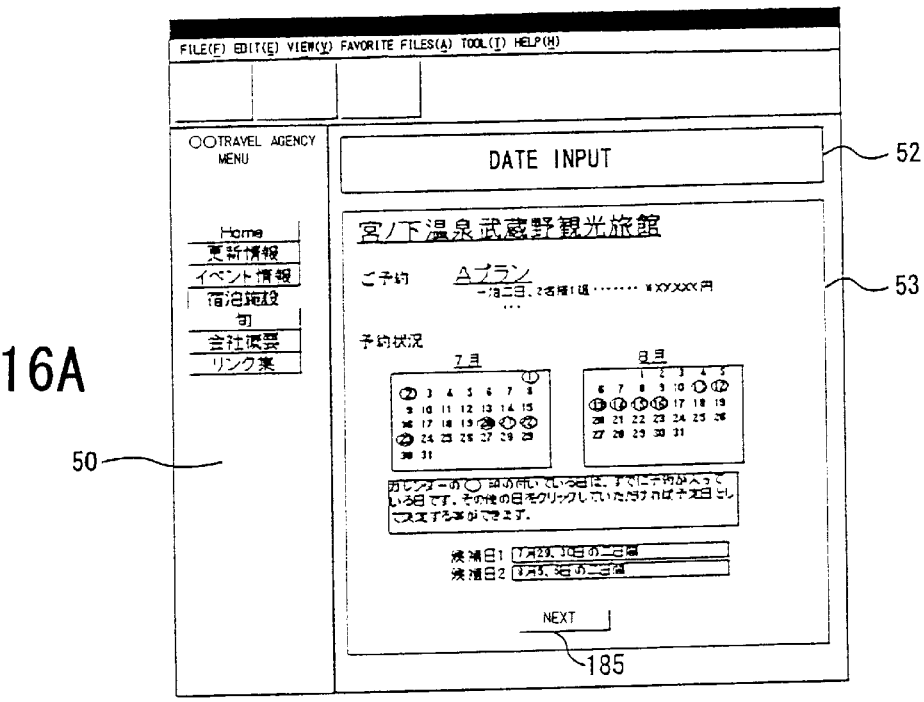
FIGS. 16A and 16B show screens in the procedures of providing accommodation booking service in accordance with the present invention.
Figure 16B:
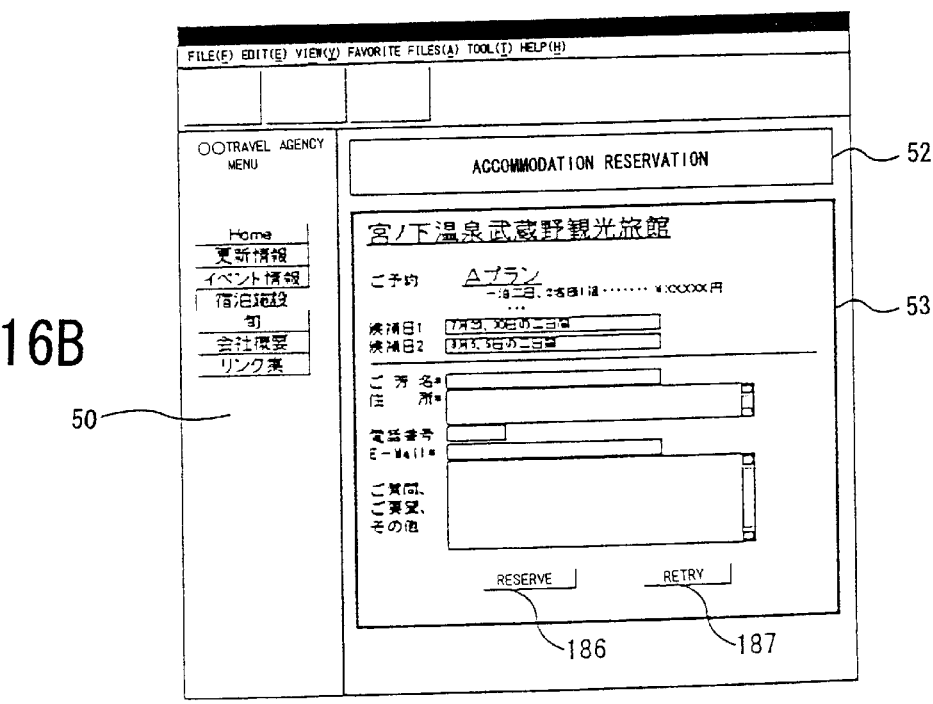

(11) When advancing to the reservation service, the server application 21 of the travel agency displays vacancy information of the accommodation facilities handled by the travel agency, and prompts the service user to input a desired date ((11), FIG. 16A).

(12) The server application 21 of the travel agency further prompts the service user to input a name, an address, and a telephone number, and makes a reservation of the selected accommodation facility under the inputted name and other information (the reservation is carried out through an on-line or telephone communication). At a later date, the service user will be notified, in a predetermined manner, of the reservation result and information as to how to pay for the accommodation ((12), FIG. 16B).

The above specific example is advantageous in that an accommodation facility that meets more clearly with a request can be selected from a map that shows the surrounding area of the accommodation facility, compared with a case in which a desired accommodation facility is selected from a list that contains only character information such as addresses.

SPECIFIC EXAMPLE 2

Next, a case where the system of the present invention is applied to a geographic information distribution service utilizing maps will be described as a second specific example of the system of the present invention. In this example, the search object publisher is a local information distributor.

At a Web site for distributing local information, item information (including information that is updated in real time, such as information on concert dates) is stored in such a manner that desired information can be retrieved as an index on the map.

This service will be described in greater detail, with reference to FIG. 6.

(1) The local information distributor registers in advance the positional coordinates of search objects, icon type codes, the names and addresses of facilities, and other information in the storage device 14 (the search object database) ((1)).

(2) The service user selects the service for obtaining information from maps on the Web page of the local information distributor ((2)).

(3) Upon receipt of the request from the service user, the server application 21 of the local information distributor requests the geographic information distributor to display a map search initial screen image in a designated format. Here, if the area is designated as Nihonbashi, a map of the surrounding area of Nihonbashi should be the map search initial screen image. The geographical information distributor that has received the request from the local information distributor checks the registration ID of the local information distributor contained in the request information ((3)).

(4) The map search and distribution application 12 of the geographical information distributor then retrieves a map in the requested range from the map database 13, and further retrieves items that are contained in the requested range and correspond to the confirmed registration ID of the local information distributor ((4)).

(5) The map search and distribution application 21 of the geographical information distributor then incorporates the retrieved facilities into the retrieved map by displaying icons corresponding to the icon type codes based on the positional coordinates ((5)).

(6) The map search and distribution application 12 of the geographical information distributor transmits the incorporated map image to the service user that has made the request in (2), and a map and a list of the facilities are displayed on the terminal 31 of the service user ((6)).

(7) the service user then performs operations such as enlargement, reduction, and scrolling, on the map, thereby requesting the map search and distribution application 12 of the geographical information distributor to display a new map display range. After that, the processes of (4), (5), and (6) are repeated, so that a map image that contains the locations of facilities contained in the requested range is displayed ((7)).

(8) The service user selects one facility from the list of the facilities or the icons displayed through the above processes. By doing so, the information of the selected facility is transmitted to the geographical information distributor ((8)).

(9) The map search and distribution application 12 of the geographical information distributor that has received the information of the selected facility then transmits the item ID of the facility selected by the service user to the local information distributor ((9)).

Figure 17A:
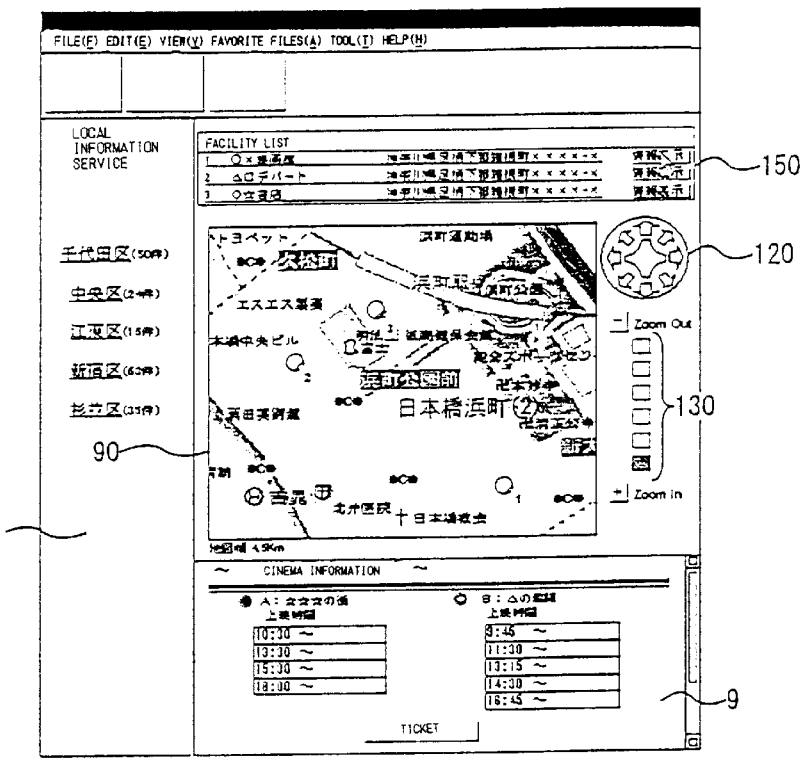
FIG. 17A is a display of a Web page of cinema information supplied by an information provider.
Figure 17B:
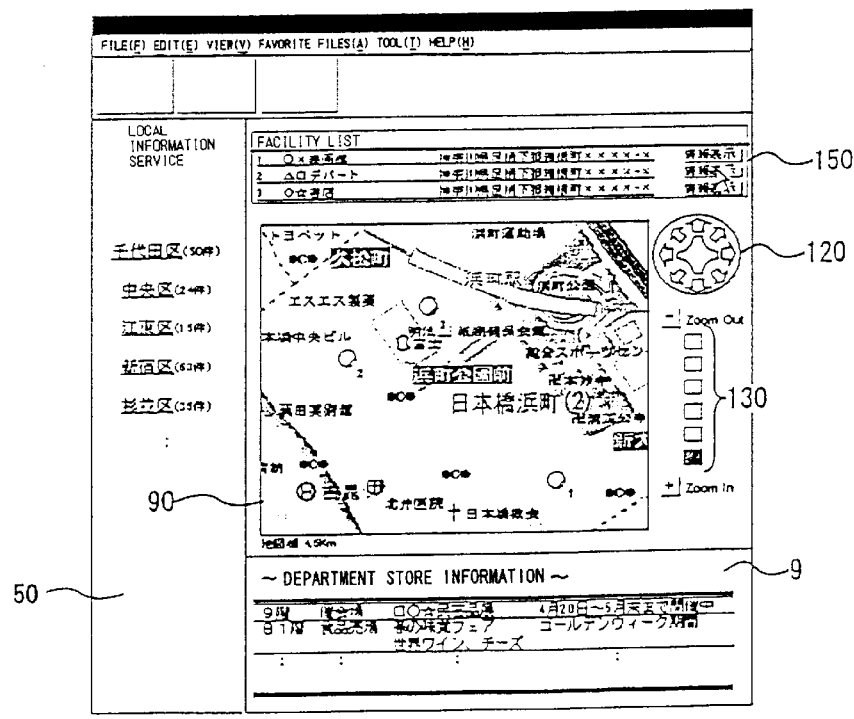
FIG. 17B is a display of a Web page of department store information.

(10) The server application 21 of the local information distributor displays the information of the search object (FIGS. 17A and 17B). The information contents shown in the figures can be set by the local information distributor at will. Accordingly, various types of facility information can be shown on the Web page.

In the above specific example, a map screen image supplied by the geographical information distributor and a local information screen image provided by the search object publisher (the local information distributor) are displayed at the same time.

Depending on the type of the facility, the displayed information includes various information, such as a menu and photographs of dishes served at a restaurant. In a case of a ticket agency, a ticket purchase button is prepared on the display, so that a service user can click the ticket purchase button to purchase a desired ticket.

In this specific example, desired information is retrieved not only from a list of character information, but also from a map of the surrounding area. Accordingly, geographical and visual search for information can be carried out. In other words, maps can be used as an index of information.

In the description above, the search object publisher is a travel agency, but other retailers may be involved as described hereafter.

SPECIFIC EXAMPLE 3

In this specific example, the search object publisher is a retailer on the Internet, and a shop at which a user can receive goods ordered through the Internet can be searched for on a map on the Internet. In this case, search objects are shops at which users can receive goods and pay for them.

For instance, in a case where a user can order desired goods through the Internet and receive the goods at a convenience store or a gas station, the reception shops can be displayed and searched for on a map.

In this example, a reception shop can be selected on a map, so that a user can select the most convenient shop in the user's neighborhood or near the user's workplace or on the way home.

SPECIFIC EXAMPLE 4

In this example, the search object publisher is a real estate agent, and the search objects are real estates. Real estate information or housing information is displayed and searched for on maps.

In this service, when a real estate displayed on a map is selected, the details of the real estate, such as the lot area, a plan view, or a floor plan, are displayed. Conventional real estate information includes only character information, such as "3 minutes from the nearest station on foot". On the other hand, the detail information obtained through this service includes the accurate location of the real estate and the geographical information of the surrounding area.

SPECIFIC EXAMPLE 5

In this example, the search object publisher is a chain restaurant headquarters, and the search objects are the chain restaurants. Detailed information on the chain restaurants can be displayed and searched for on maps. More specifically, opening hours and photographic data such as the appearance of a restaurant searched for and selected by a user are displayed on a Web page of the chain restaurant.

This service is advantageous in that various information such as photographs that cannot be stored in the search object database of the geographical information distributor can be displayed.

SPECIFIC EXAMPLE 6

In this example, the search object publisher is a recruitment information provider, and the search objects are office addresses of companies and firms that are offering jobs. Here, job vacancy information is displayed and searched for on a map.

In this example, the locations of offices of companies included in the job vacancy information are plotted on a map, and the relevant information in a desired area can be obtained using the map as an index. Also, by inputting the address of a user, other information such as the time required for commuting and commuting expenses may be automatically provided.

This service is advantageous in that geographical information, which is an important factor in job hunting, can be provided for users.

The present invention is not limited to the specifically disclosed embodiments, but variations and modifications may be made without departing from the scope of the present invention.

The present application is based on Japanese priority application No. 2000-195268, filed on Jun. 28, 2000, the entire contents of which are hereby incorporated by reference.

What is claimed is:

1. A geographical information distribution system that is communicable with a service user and a search object publisher offering a service via a communication network, wherein the geographical information distribution system responds to a request of the search object publisher and provides at least geographical information to the service user, the geographical information distribution system comprising:
   a map database that stores map data;
   a search object database that stores data of search objects registered by the search object publisher via the network, the data of search objects including item IDs representing the search objects;
   a search object publisher database that stores server information of the search object publisher registered by the search object publisher via the network;
   a search map generation unit that generates a search map using the map data and the search object data based on a request made by the service user through the communication network; and
   a distribution coordinator that transmits the search map to the service user through the network to allow the service user to select a desirable search object in the search map, receives the selected search object from the service user, and transmits the item ID of the selected search object to the search object publisher, with reference to the server information of the search object publisher, in order to feed back the user's selection to the search object publisher for further processing making use of item ID.

2. A method of distributing geographical information via a network through which a geographical information distributor having a geographical information distribution system, a service user, and a search object publisher are connected with each other, wherein the geographical information distribution system responds to a request of the search object publisher and provides at least geographical information to the service user, said method comprising the steps of:
   storing data containing item IDs of search objects registered via the network by the search object publisher;
   storing server information of the search object publisher registered via the network by the search object publisher;
   allowing the service user to remotely access over the network a page provided by the search object publisher;
   allowing the service user to select a button on the page;
   notifying the geographical information distributor of the selection of the button by the service user;
   generating, at the geographical information distributor, a map exhibiting the search objects offered by the search object publisher;
   displaying the generated map on the page, wherein the search objects on the map are selectable by the service user; and
   upon selection of any one of the search objects by the user, transmitting the selected search object to the search object publisher, with reference to the server information of the search object publisher, in order to feed back the user's selection to the search object publisher for further processing by the search object publisher, making use of the same ID.

3. The method as claimed in claim 2, wherein the step of transmitting includes transmitting identification information of the selected search object to the server of the search object publisher.

4. The method as claimed in claim 2, further comprising the step of registering or making a change to a search object by designating the desired search object on the map transmitted from the server of the geographic information distributor.

5. The method as claimed in claim 4, wherein the step of registering or making a change to a search object is carried out by designating a location of the desired search object on the map or designating attribute information of the desired search object.

6. The method as claimed in claim 2, further comprising the step of collectively registering the search objects using positional information of the search objects to be registered.

7. The method as claimed in claim 2, further comprising the step of making a change to a display range of the map by the service user performing an enlargement operation, a reduction operation, or a relocating operation on the map that shows the search objects, or performing a designating operation on geographical identification information.

8. The method as claimed in claim 2, further comprising the step of displaying attribute information on the map, such as names, addresses, and telephone numbers of the search objects shown on the map.

9. The method as claimed in claim 8, wherein the step of selecting a desired search object is carried out by the service user designating one of the search objects on the map or designating a piece of the attribute information displayed on the map.

10. A method of specifying contents of a service selected by a service user via a network, through which the service user, a search object publisher, and a geographical information distributor having a geographical information distribution system are communicable with each other, wherein the geographical information distribution system responds to a request of the search object publisher and provides at least geographical information to the service user, said method comprising the steps of:

storing data containing item IDs representing search objects registered via the network by the search object publisher;

storing server information of the search object publisher registered via the network by the search object publisher;

allowing the service user to access a Web page provided by the search object publisher;

allowing the service user to click a "search on map" button on the Web page;

notify the geographical information distributor of the clicking of the "search on map" button by a service user;

generating at the geographical information distributor a map exhibiting the search objects offered by the search object publisher and displaying the generated map on the Web page;

allowing the service user to select a desired search object directly on the map;

transmitting the item ID representing the selected search object from the geographical information distributor to the search object publisher, with reference to the server information of the search object publisher, so as to allow the search object publisher to identify the contents of the search object selected by the service user and to advance to the next service making use of the item ID.

11. A server that distributes geographical information, the server being communicable with a service user and a search object publisher offering a service on a Web page accessible from the service user via a network, wherein the server responds to a request of the search object publisher and provides at least geographical information to the service user, the server comprising:

a map database that stores map data;

a search object database that stores item IDs of search objects associated with the service offered by the search object and registered by the search object publisher via the network;

a search object publisher database that stores server information of the search object publisher;

a search map generation unit that generates a search map using the map data and the search object data, based on a request from the service user; and a transmission unit that transmits the search map generated by the search map generation unit to a terminal of the service user in order to allow the service user to select a desired search object directly on the search map, and transmits the item ID of the search object selected by the service user to the server of the search object publisher, with reference to the server information of the search object publisher, in order to feed back the user's selection to the search object publisher for further processing the service by the search object publisher making use of the item ID.

12. The server as claimed in claim 11, wherein the data concerning the search objects is made up of character strings including identification information, positional information, and icon identification information of each of the search objects.

13. The server as claimed in claim 12, wherein the search map generation unit incorporates the search objects as icons into the map data, based on the search object data made up of the character strings, and displays each of the incorporated search objects at each corresponding coordinate location.

* * * * *

UNITED STATES PATENT AND TRADEMARK OFFICE
CERTIFICATE OF CORRECTION

PATENT NO. : 6,691,114 B1
DATED : February 10, 2004
INVENTOR(S) : Kotaro Nakamura It is certified that error appears in the above-identified patent and that said Letters Patent is hereby corrected as shown below:

Title page,
Item [56], References Cited, FOREIGN PATENT DOCUMENTS, insert:
-- JP     11-0149483    6/1999
      JP     2000-0035971   2/2000 --

Signed and Sealed this

Twenty-second Day of March, 2005

JON W. DUDAS
*Director of the United States Patent and Trademark Office*